United States Patent Office 2,900,401
Patented Aug. 18, 1959

2,900,401

FERROCENE DERIVATIVES

William Baptist Hardy, Bound Brook, and Erwin Klingsberg, Mountainside, N.J., assignors to American Cyanamid Company, New York, N.Y., a corporation of Maine No Drawing. Application January 21, 1954
Serial No. 405,506

1 Claim. (Cl. 260—439)

This invention relates to dyestuffs and dyestuff intermediates containing the ferrocene nucleus.

Iron bis-cyclopentadienyl which has been given the name ferrocene is a new structural system in which two cyclopentadienyl nucleus,

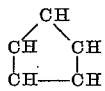

are united by a single atom of iron. Derivatives have also been described.

According to the present invention various derivatives of ferrocene are prepared which are dyestuffs or dyestuff intermediates. A series of derivatives of ferrocene which is of interest for dyestuff and pigment purposes is obtained by ring closing the known condensation product of ferrocene and phthalic anhydride which is, of course, an ortho-carboxybenzoylferrocene. For instance, bis-o-carboxybenzoylferrocene, obtained by condensing phthalic anhydride with ferrocene, is one such well-known compound and is disclosed in the communication of R. B. Woodward et al. reported in the Journal of the American Chemical Society, vol. 74, pages 3458–3459. The ring closure produces phthaloyl derivatives which show marked analogies in structure to that of anthraquinone. Cyclization can be effected with various agents, polyphosphoric acid being preferred where an unsubstituted phthaloyl ferrocene is to be prepared. Titanium tetrachloride can also be used for cyclization but in such a case a chlorinated product is produced.

The phthaloyl ferrocenes are deeply colored compounds which are useful as pigments. Many derivatives can be prepared by starting with a corresponding substituted phthalic acid, for example, nitrophthalic acid. These derivatives can then be transformed into amino derivatives by reduction and further dyes and pigments prepared by acylation or arylation of the amino groups or by diazotization and coupling. In this respect it has been found that the phthaloyl ferrocenes possess a number of properties similar to those of the corresponding anthraquinone derivatives. Even deeper shades may be obtained by condensation to form ferrocene derivatives analogous to anthrimides. Such arylation may either be with another ferrocene derivative or with an anthraquinone derivative. All these products are deeply colored.

The invention will be illustrated in greater detail by the following specific examples in which the parts are by weight unless otherwise specified.

Example 1

One part of bis(o-carboxybenzoyl) ferrocene is heated with 50 parts of polyphosphoric acid, giving a deep brown solution. The latter is stirred at about 130° C. until ring closure is complete. The brown product is isolated by drowning, filtering and washing. Traces of unreacted starting material are removed by slurrying in dilute aqueous alkali and filtering and washing. The product is unmelted at 360° C. and has little solubility.

Example 2

One part of bis(o-carboxybenzoyl) ferrocene is heated at reflux in 150 parts of titanium tetrachloride until ring closure is complete. The mixture is drowned in aqueous hydrochloric acid and the product is isolated by filtration and washing. The product, which is insoluble in aqueous caustic, was found on analysis to be a chlorinated derivative of the product obtained as described in Example 1.

We claim:

A process of producing a chlorinated phthaloyl ferrocene which comprises heating an ortho-carboxybenzoyl ferrocene with titanium tetrachloride until ring closure is substantially complete.

References Cited in the file of this patent

Richter: Textbook of Organic Chemistry, Third Edition (1952), p. 536.

Woodward et al.: J. Am. Chem. Soc., vol. 74 (1952), pp. 3458–3459.